US010737757B2

(12) United States Patent
Koncz

(10) Patent No.: US 10,737,757 B2
(45) Date of Patent: Aug. 11, 2020

(54) SYSTEMS AND METHODS FOR ASSEMBLING A STRUCTURALLY REINFORCED COMPOSITE STRUCTURE

(71) Applicant: The Boeing Company, Chicago, IL (US)

(72) Inventor: Tibor Albert Koncz, Monroe, WA (US)

(73) Assignee: The Boeing Company, Chicago, IL (US)

( * ) Notice: Subject to any disclaimer, the term of this patent is extended or adjusted under 35 U.S.C. 154(b) by 290 days.

(21) Appl. No.: 15/729,442

(22) Filed: Oct. 10, 2017

(65) Prior Publication Data

US 2018/0029687 A1 Feb. 1, 2018

Related U.S. Application Data

(62) Division of application No. 14/312,399, filed on Jun. 23, 2014, now Pat. No. 9,815,543.

(51) Int. Cl.
*B29C 64/10* (2017.01)
*B64C 1/06* (2006.01)
*B64F 5/10* (2017.01)
*B64C 1/00* (2006.01)

(52) U.S. Cl.
CPC ............... *B64C 1/068* (2013.01); *B64F 5/10* (2017.01); *B64C 2001/0072* (2013.01); *Y02T 50/43* (2013.01)

(58) Field of Classification Search
CPC . B64F 5/10; Y02T 50/42; Y02T 50/43; Y02T 50/44; B64C 1/00; B64C 1/06; B64C 1/061; B64C 1/063; B64C 1/068; B64C 1/069; B64C 1/08; B64C 1/12; B64C 2001/0054; B64C 2001/0072; B64C 2001/00
See application file for complete search history.

(56) References Cited

U.S. PATENT DOCUMENTS

| 7,503,368 B2 | 3/2009 | Chapman et al. |
| 2006/0108058 A1* | 5/2006 | Chapman ............... B29C 70/323 |
| | | 156/245 |
| 2013/0152397 A1* | 6/2013 | Oberoi ...................... B64C 1/18 |
| | | 29/897.2 |

(Continued)

*Primary Examiner* — Joseph S Del Sole
*Assistant Examiner* — Jamel M Nelson
(74) *Attorney, Agent, or Firm* — DASCENZO Intellectual Property Law, P.C.

(57) ABSTRACT

Systems and methods for assembling a structurally reinforced composite structure are disclosed herein. The methods include deforming a composite tubular skin to a deformed conformation to generate clearance to permit a frame assembly to be conveyed into an internal volume that is defined by the composite tubular skin. The methods further include conveying the frame assembly into the internal volume, permitting the composite tubular skin to deform from the deformed conformation to the target conformation, and operatively attaching the frame assembly to the composite tubular skin to form the structurally reinforced composite structure. The systems include a frame support that is configured to support the frame assembly, a frame deformation assembly, a skin support that is configured to support the composite tubular skin, and a skin deformation assembly.

20 Claims, 8 Drawing Sheets

(56) References Cited

U.S. PATENT DOCUMENTS

2015/0136910 A1* 5/2015 Hussain .................. C08L 63/00
                                                    244/133
2015/0166167 A1* 6/2015 Kies ........................ B64C 1/10
                                                    244/119

* cited by examiner

SYSTEMS AND METHODS FOR ASSEMBLING A STRUCTURALLY REINFORCED COMPOSITE STRUCTURE

RELATED APPLICATION

This application is a divisional of and claims priority under 35 USC 120 to U.S. patent application Ser. No. 14/312,399, entitled "SYSTEMS AND METHODS FOR ASSEMBLING A STRUCTURALLY REINFORCED COMPOSITE STRUCTURE," filed on Jun. 23, 2014, the complete disclosure of which is hereby incorporated by reference.

FIELD

The present disclosure relates to systems and methods for assembling structurally reinforced composite structures that include a frame assembly and a composite tubular skin, and more specifically to systems and methods that deform the composite tubular skin and/or the frame assembly to permit the frame assembly to be conveyed into an inner volume that is defined by the composite tubular skin.

BACKGROUND

Aircraft often include several different, or discrete, components and/or sub-assemblies that may be separately manufactured and subsequently combined during assembly of the aircraft. Each of these sub-assemblies may be manufactured at different locations (geographically and/or within a given manufacturing facility) to specified manufacturing tolerances. Often, these sub-assemblies may be quite large, and assembly of the sub-assemblies to construct the aircraft many present unique manufacturing challenges.

As an illustrative, non-exclusive example, a fuselage barrel of an aircraft may include a tubular outer skin and a frame assembly. In the assembled fuselage barrel, the frame assembly may be located within an inner volume that is defined by the tubular outer skin and may provide mechanical support for the tubular outer skin. Because of the size and complexity of the fuselage barrel, assembly thereof may be a time-consuming, complex, and/or expensive process. For example, after formation of the tubular outer skin, various components of the frame assembly may be located and combined, piece-by-piece, within the inner volume. Thus, there exists a need for improved systems and methods for assembling a structurally reinforced composite structure, such as a fuselage barrel of an aircraft.

SUMMARY

Systems and methods for assembling a structurally reinforced composite structure are disclosed herein. The methods include deforming a composite tubular skin to a deformed conformation to generate clearance to permit a frame assembly to be conveyed into an internal volume that is defined by the tubular skin. The methods further include conveying the frame assembly into the internal volume, permitting the tubular skin to deform from the deformed conformation to the target conformation, and operatively attaching the frame assembly to the tubular skin to form the structurally reinforced composite structure.

In some embodiments, the structurally reinforced composite structure is a fuselage barrel of an aircraft. In some embodiments, the tubular skin is an outer skin of the fuselage barrel. In some embodiments, the frame assembly includes a first sub-frame and a second sub-frame. In some embodiments, the first sub-frame is at least substantially rigid in a first direction and/or in a second direction. In some embodiments, the second sub-frame includes a first upper side frame and a second upper side frame.

In some embodiments, the deforming the tubular skin includes decreasing a first dimension of the inner volume and concurrently increasing a second dimension of the inner volume. In some embodiments, the deforming includes applying a deformation force to the tubular skin. In some embodiments, and prior to the deforming, a clearance between the frame assembly and the tubular skin is insufficient to permit the conveying. In some embodiments, and subsequent to the deforming, the clearance is sufficient to permit the conveying.

In some embodiments, the methods further include deforming the frame assembly. In some embodiments, the deforming the frame assembly includes deforming the first sub-frame. In some embodiments, the deforming the frame assembly includes urging an unattached end of the first upper side frame toward an unattached end of the second upper side frame. In some embodiments, and subsequent to the conveying, the methods further include releasing the unattached end of the first upper side frame and the unattached end of the second upper side frame to permit the operatively attaching.

In some embodiments, the methods further include extending a crown frame between the unattached end of the first upper side frame and the unattached end of the second upper side frame. In some embodiments, the methods further include operatively attaching the crown frame to the tubular skin. In some embodiments, the methods further include adjusting a distance between the unattached end of the first upper side frame and the unattached end of the second upper side frame with the crown frame such that the crown frame is in contact with the tubular skin.

In some embodiments, the operatively attaching includes operatively attaching the frame assembly and the tubular skin at an initial attachment point and subsequently operatively attaching the frame assembly and the tubular skin at a plurality of subsequent attachment points. In some embodiments, the subsequently operatively attaching includes progressing around a perimeter of the inner volume by operatively attaching at a given subsequent attachment point on a given side of the initial attachment point and at a corresponding subsequent attachment point on an opposite side of the initial attachment point prior to operatively attaching at a location that is farther from the initial attachment point than the given subsequent attachment point.

The systems include a frame support that is configured to support the frame assembly, a frame deformation assembly that is configured to selectively deform the frame assembly, a skin support that is configured to support the tubular skin, and a skin deformation assembly that is configured to selectively deform the tubular skin. In some embodiments, the systems further include a conveyance structure that is configured to translate the frame support and the skin support relative to one another to convey the frame assembly into the inner volume. In some embodiments, the systems further include an assembly robot that is configured to operatively attach the frame assembly to the tubular skin. In some embodiments, the systems include the tubular skin and the frame assembly.

DESCRIPTION

Figure 1:
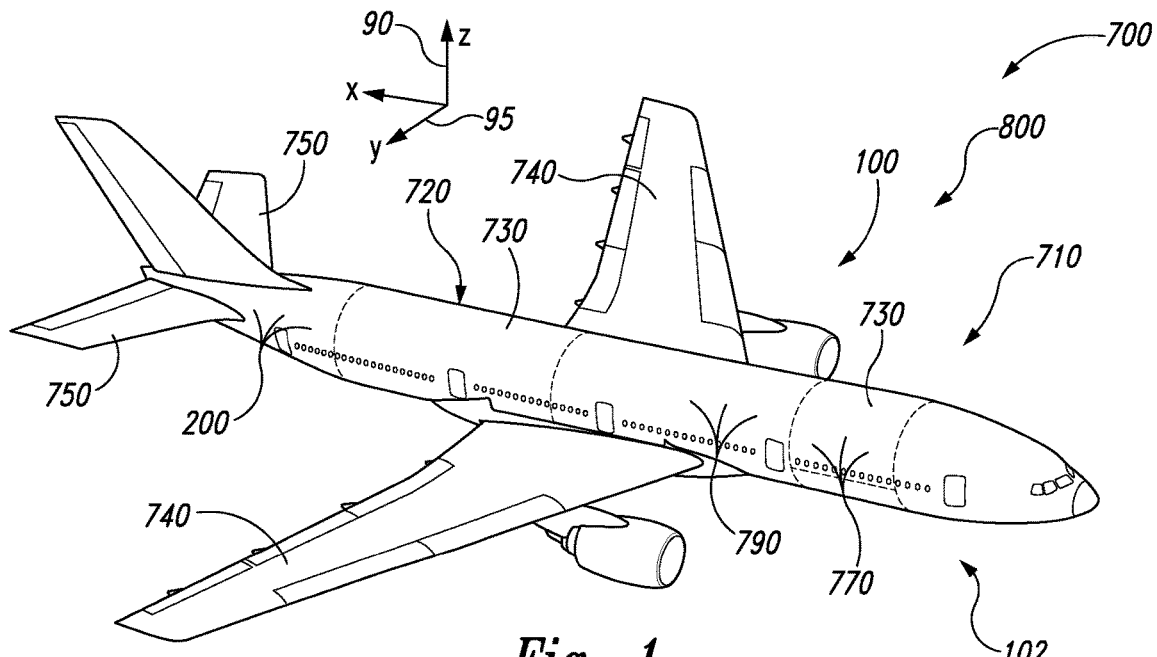
FIG. 1 is a schematic representation of an illustrative, non-exclusive example of an aircraft that may be assembled using the systems and methods according to the present disclosure.

FIGS. 1-11 provide illustrative, non-exclusive examples of structurally reinforced composite structures 800 that may be assembled using the systems and methods according to the present disclosure, of components of structurally reinforced composite structures 800, of assembly processes, according to the present disclosure, for forming structurally reinforced composite structures 800, of systems 20, according to the present disclosure, for assembling structurally reinforced composite structures 800, and/or of methods 300, according to the present disclosure, of forming structurally reinforced composite structures 800. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and one or more elements shown in solid lines may be omitted from a given embodiment without departing from the scope of the present disclosure.

Figure 2:
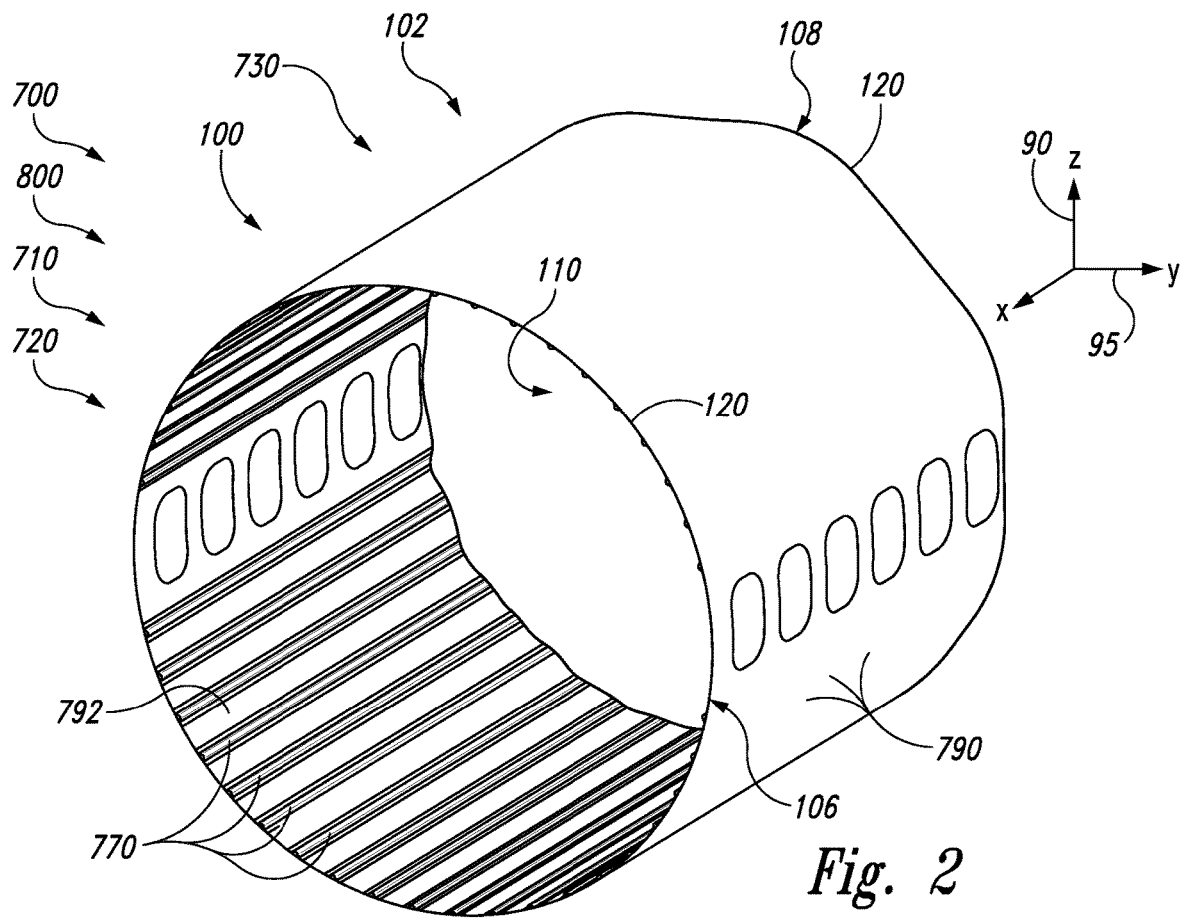
FIG. 2 is a schematic representation of a composite tubular skin of an aircraft that may utilized with and/or included in the systems and methods according to the present disclosure.
Figure 3:
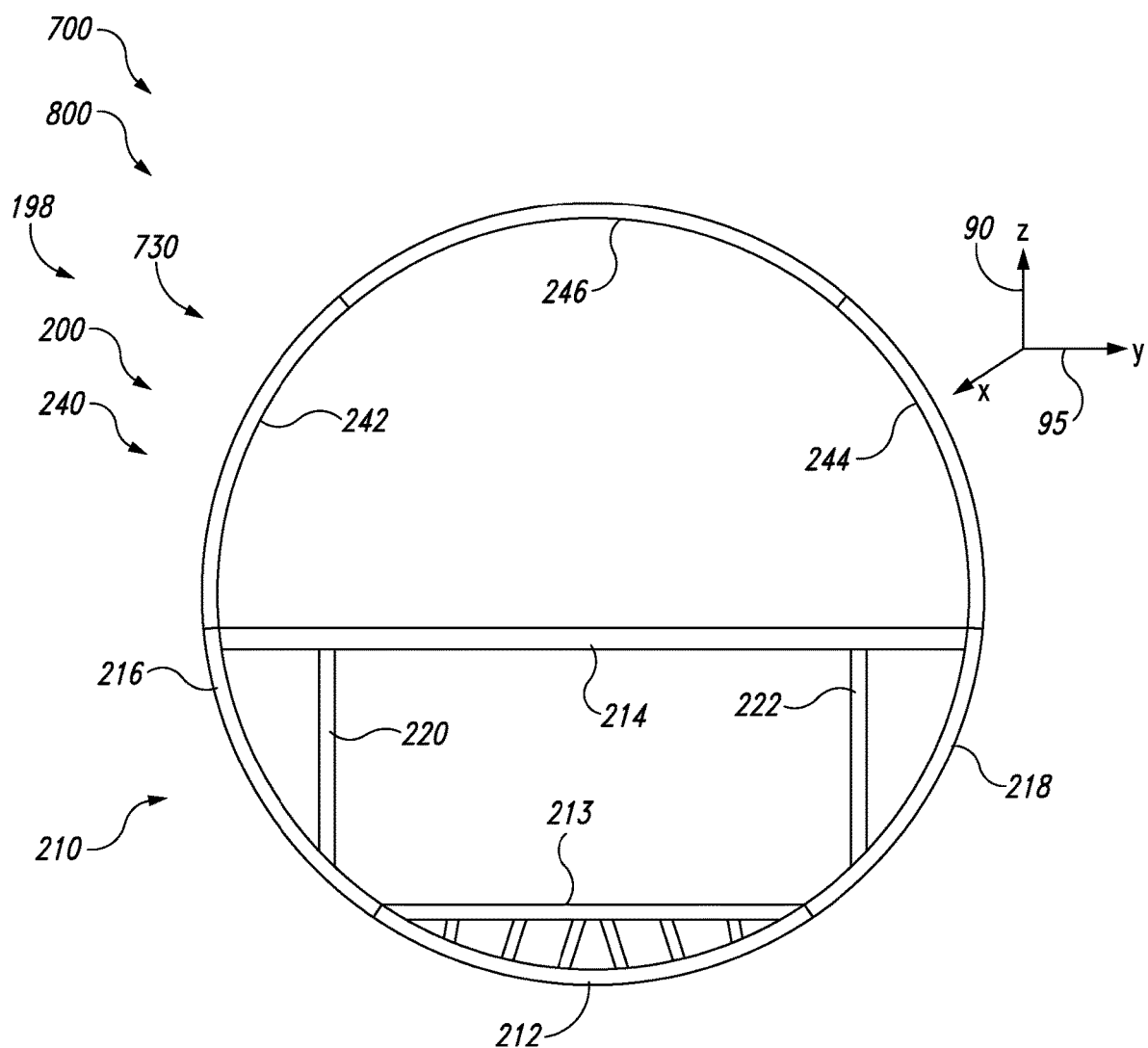
FIG. 3 is a schematic representation of a frame assembly of an aircraft that may be utilized with and/or included in the systems and methods according to the present disclosure.

FIG. 1 is a schematic representation of an illustrative, non-exclusive example of an aircraft 700 that includes a structurally reinforced composite structure 800 that may be constructed utilizing the systems and methods according to the present disclosure. FIG. 2 is a schematic representation of an illustrative, non-exclusive example of a composite tubular skin 100, in the form of a tubular skin of a fuselage barrel 730 (or an outer skin of fuselage barrel 730), that may form a portion of aircraft 700. Composite tubular skin 100 also may be referred to herein as a tubular skin 100. FIG. 3 is a schematic representation of an illustrative, non-exclusive example of a frame assembly 200, in the form of a frame assembly of fuselage barrel 730, that may form a portion of aircraft 700.

FIGS. 2-3 illustrate tubular skin 100 and/or frame assembly 200 as forming a portion of fuselage barrel 730; however, it is within the scope of the present disclosure that tubular skin 100 and/or frame assembly 200 may define any suitable portion of aircraft 700 and/or of any (other) structurally reinforced composite structure 800. In addition, the systems and methods disclosed herein may be utilized to form any suitable structurally reinforced composite structure 800, which may (but is not required to) form any suitable portion of aircraft 700. As illustrative, non-exclusive examples, structurally reinforced composite structure 800 may form a portion (or even all) of an airframe 710, a fuselage 720, fuselage barrel 730, a wing 740, and/or a stabilizer 750 of aircraft 700 (as illustrated in FIG. 1).

Aircraft 700 and/or structurally reinforced composite structure 800 may include a plurality of skin segments 790 that may form one or more tubular skins 100 and that may cover and/or be an outer surface of any suitable portion of aircraft 700. As illustrated most clearly in FIG. 2, aircraft 700 also may include a plurality of stringers 770 that, together with frame assembly 200, may support an inner surface 792 of tubular skins 100.

With continued reference to FIG. 2, tubular skin 100 may partially bound and/or may define an inner volume 110. Inner volume 110 also may be referred to herein as internal volume 110, enclosed volume 110, and/or included volume 110 and may contain frame assembly 200 of structurally reinforced composite structure 800, only a portion of which is illustrated in FIG. 2. Tubular skin 100 may define a longitudinal axis (such as the X-axis in FIG. 2) and two transverse axes (such as the Y and Z-axes in FIG. 2). Under these conditions, tubular skin 100 may extend along the longitudinal axis between a first end 106 and a second end 108 thereof, and inner volume 110 may be defined between first end 106 and second end 108. Stated another way, tubular skin 100 may encircle, encompass, and/or surround a portion of inner volume 110.

Tubular skin 100 may define one or more openings 120. Openings 120 may be defined at, or near, first end 106 and/or second end 108. Additionally or alternatively, openings 120 may be defined (at least substantially) in a transverse plane of tubular skin 100 (e.g., in the Y-Z plane).

Tubular skin 100 may define and/or have a desired, or target conformation 102 when assembled within structurally reinforced composite structure 800. Frame assembly 200 may be adapted, configured, designed, constructed, and/or located to support tubular skin 100 such that tubular skin 100 defines target conformation 102.

It is within the scope of the present disclosure that tubular skin 100 may have and/or define a constant, or at least substantially constant, transverse cross-sectional shape when tubular skin 100 is in target conformation 102. In other words, the transverse cross-sectional shape of tubular skin 100 may be constant (or at least substantially constant) along the longitudinal (or X) axis and/or along a length thereof (with the length being measured between first end 106 and second end 108). Additionally or alternatively, the transverse cross-sectional shape of tubular skin 100 may vary along the length of tubular skin 100 when tubular skin 100 is in target conformation 102. As an illustrative, non-exclusive example, the transverse cross-sectional shape of tubular skin 100 may taper and/or decrease from first end 106 to second end 108.

Tubular skin 100 may have and/or define any suitable (transverse) cross-sectional shape. As illustrative, non-exclusive examples, tubular skin 100 may have and/or define a circular transverse cross-sectional shape, an elliptical transverse cross-sectional shape, an open-center figure-eight transverse cross-sectional shape, and/or a transverse cross-sectional shape that extends (completely) around inner volume 110.

Tubular skin 100 also may be formed from and/or include any suitable material and/or materials of construction. This may include flexible materials and/or materials that are flexible enough to permit a sufficient degree, or amount, of elastic deformation to perform the methods and/or assembly processes that are discussed in more detail herein. As an illustrative, non-exclusive example, tubular skin 100 may include a composite fiber and a resin material. As a more specific but still illustrative, non-exclusive example, tubular skin 100 may be formed from a plurality of layers of a pre-impregnated composite material that includes the composite fiber and the resin material. Illustrative, non-exclusive examples of the composite fiber include a fiberglass fiber, a fiberglass cloth, a carbon fiber, and/or a carbon cloth. Illustrative, non-exclusive examples of the resin material include an epoxy, an adhesive, and/or a polymeric resin.

Turning to FIG. 3, frame assembly 200 may include a first sub-frame 210 and/or a second sub-frame 240. First sub-frame 210 and second sub-frame 240 may be operatively attached to one another. During assembly of structurally reinforced composite structure 800, first sub-frame 210 may be (at least substantially) rigid in a first direction 90 (such as the Z-direction) and/or in a second direction 95 (such as the Y-direction). In contrast, and during assembly of structurally reinforced composite structure 800, second sub-frame 240 may have and/or possess a degree of elastic flexibility in the first direction and/or in the second direction. Thus, and as discussed in more detail herein, the methods and/or assembly processes according to the present disclosure may include elastic deformation of second sub-frame 240 to permit frame assembly 200 to be located within inner volume 110 of tubular skin 100 (as illustrated in FIG. 2).

As illustrated in FIG. 3, and while not required in all embodiments, first sub-frame 210 may include a keel frame 212 that includes and/or supports a cargo floor frame 213, a passenger floor frame 214, a first lower side frame 216, a second lower side frame 218, a first stanchion 220, and/or a second stanchion 222. First lower side frame 216 and second lower side frame 218 may extend between keel frame 212 and passenger floor frame 214. First stanchion 220 may extend between and/or operatively attach first lower side frame 216 and passenger floor frame 214, and second stanchion 222 may extend between and/or operatively attach second lower side frame 218 and passenger floor frame 214.

As further illustrated in FIG. 3, and while not required in all embodiments, second sub-frame 240 may include a first upper side frame 242, a second upper side frame 244, and/or a crown frame 246. First upper side frame 242 may extend from first lower side frame 216 and/or from passenger floor frame 214 to crown frame 246. Similarly, second upper side frame 244 may extend from second lower side frame 218 and/or from passenger floor frame 214 to crown frame 246. Crown frame 246 may extend between first upper side frame 242 and second upper side frame 244.

FIG. 3 illustrates the above-described components of frame assembly 200 as being separate and/or distinct components that may be operatively attached to one another, such as via any suitable fastener, to form frame assembly 200. However, it is within the scope of the present disclosure that frame assembly 200 may not include one or more of the above-described components and/or that two or more of the above-described components may be integral to one another. As an illustrative, non-exclusive example, first lower side frame 216 and first upper side frame 242 may be integral to one another and/or may be formed from a single structure. As another illustrative, non-exclusive example, second lower side frame 218 and second upper side frame 244 may be integral to one another and/or may be formed from a single structure. As additional illustrative, non-exclusive examples, first lower side frame 216 and first stanchion 220 may be integral to one another, second lower side frame 218 and second stanchion 222 may be integral to one another, and/or crown frame 246 may be integral to first upper side frame 242 and/or to second upper side frame 244.

It is within the scope of the present disclosure that the various components of frame assembly 200 may be operatively attached to one another in any suitable manner. As illustrative, non-exclusive examples, the various components may be bolted to one another, riveted to one another, fastened to one another, and/or welded to one another.

FIG. 3 illustrates a schematic representation of frame assembly 200 as viewed from a transverse plane of structurally reinforced composite structure 800. As discussed in more detail herein with reference to FIG. 4, it is within the scope of the present disclosure that structurally reinforced composite structure 800 may include a plurality of frame assemblies 200 of FIG. 3, with the plurality of frame assemblies 200 being spaced apart from one another along the length of structurally reinforced composite structure 800. Under these conditions, frame assemblies 200 collectively may be referred to herein as a frame structure 198. Furthermore, it is also within the scope of the present disclosure that one or more of the components of frame assembly 200 of FIG. 3 may extend and/or be shared among the plurality of frame assemblies 200 of frame structure 198. As illustrative, non-exclusive examples, passenger floor frame 214 and/or cargo floor frame 213 may extend along the length of structurally reinforced composite structure 800 (i.e., in the X-direction in FIG. 3) and may form a portion of a plurality of different frame assemblies 200 that are spaced apart along the length of structurally reinforced composite structure 800.

FIG. 3 illustrates a complete, or at least substantially complete, frame assembly 200 (or at least a transverse cross-sectional view of frame assembly 200). Such a complete frame assembly 200 may be present within structurally reinforced composite structure 800 subsequent to assembly of structurally reinforced composite structure 800. However, and as discussed in more detail herein, it is within the scope of the present disclosure that frame assembly 200 may be only partially assembled while being located within inner volume 110 of tubular skin 100 (as illustrated in FIG. 2). As an illustrative, non-exclusive example, frame assembly 200 may not include first upper side frame 242, second upper side frame 244, and/or crown frame 246 while being located within inner volume 110.

Figure 4:
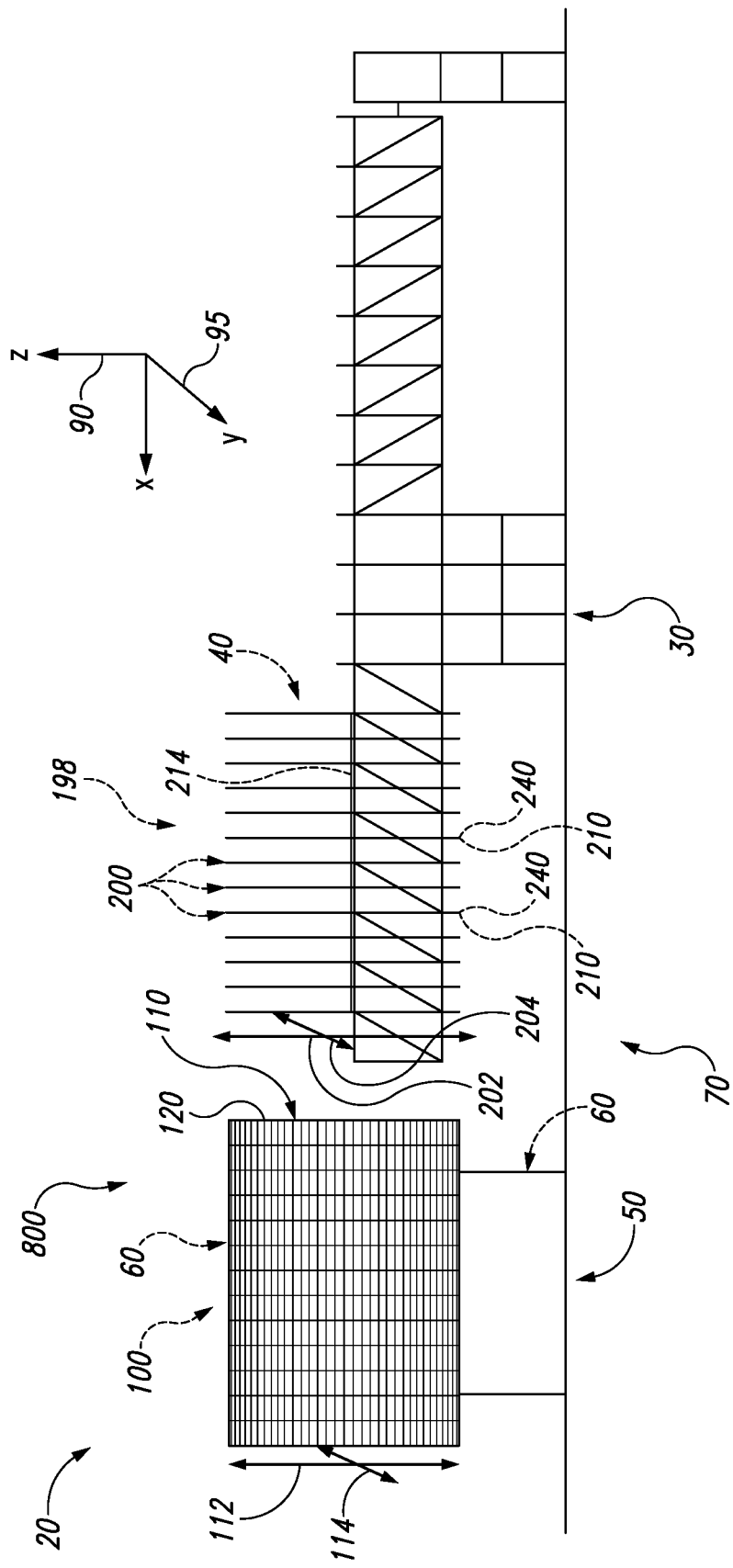
FIG. 4 is a schematic representation of illustrative, non-exclusive examples of a system, according to the present disclosure, for assembling a structurally reinforced composite structure.
Figure 5:
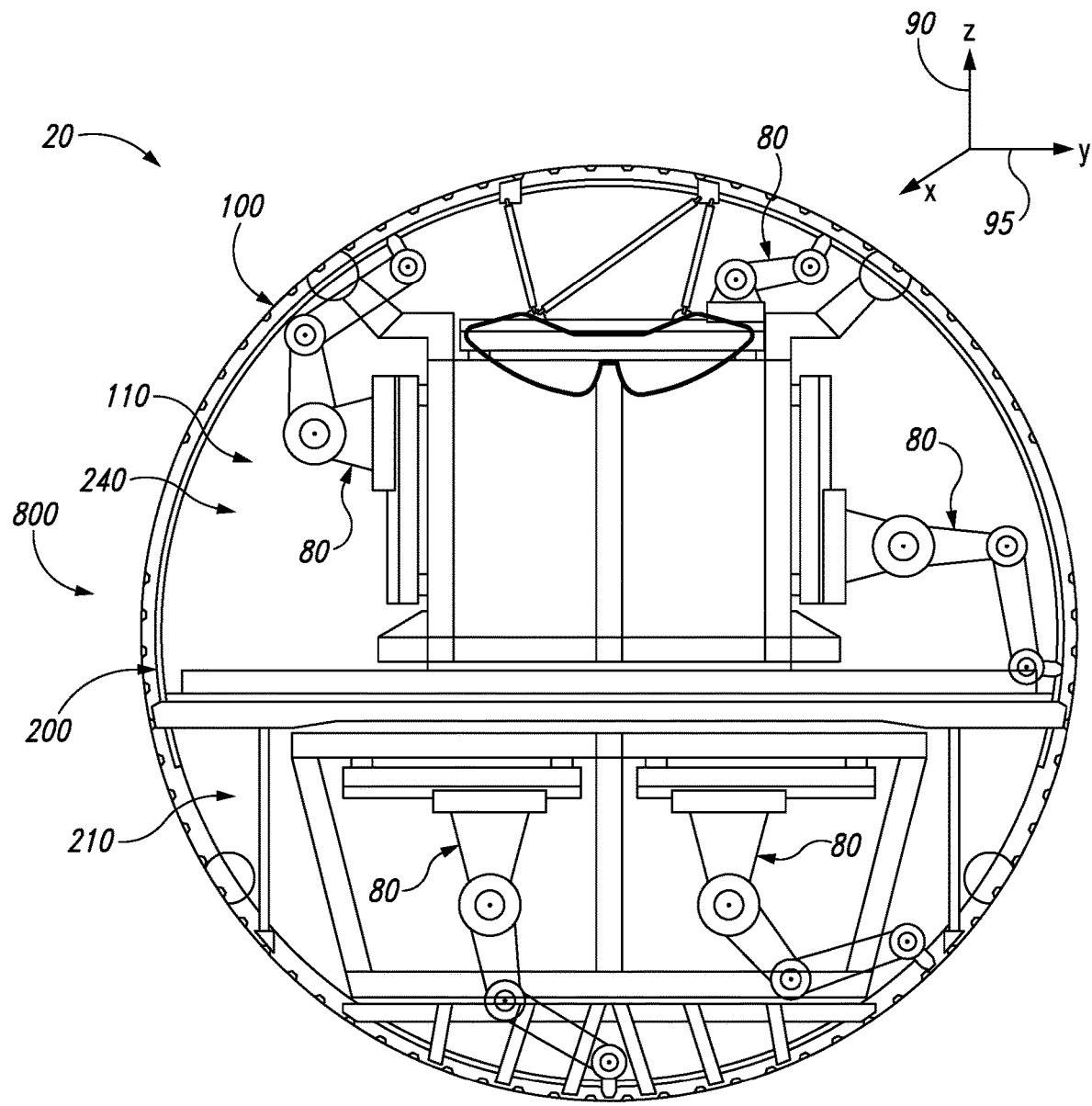
FIG. 5 is another schematic representation of illustrative, non-exclusive examples of a system, according to the present disclosure, for assembling a structurally reinforced composite structure.

FIGS. 4-5 are schematic representations of illustrative, non-exclusive examples of systems 20, according to the present disclosure, for assembling a structurally reinforced composite structure 800. As illustrated most clearly in FIG. 4, systems 20 may include a frame support 30, a skin support 50, and a skin deformation assembly 60. As also illustrated in FIG. 4, systems 20 further may include a frame deformation assembly 40, a conveyance structure 70, a tubular skin 100 of structurally reinforced composite structure 800, and/or at least a portion of a frame structure 198 that includes one or more frame assemblies 200 of structurally reinforced composite structure 800.

During operation of systems 20, frame support 30 may support frame structure 198 (or frame assemblies 200 thereof) and skin support 50 may support tubular skin 100, as illustrated. In addition, conveyance structure 70 may be configured to permit translation of tubular skin 100 and frame assemblies 200 relative to one another, such as along a longitudinal axis thereof (i.e., the X-axis) to permit frame assemblies 200 to be conveyed through an opening 120 that is defined by tubular skin 100 and to be located within an inner volume 110 that is defined by tubular skin 100.

Figure 7:
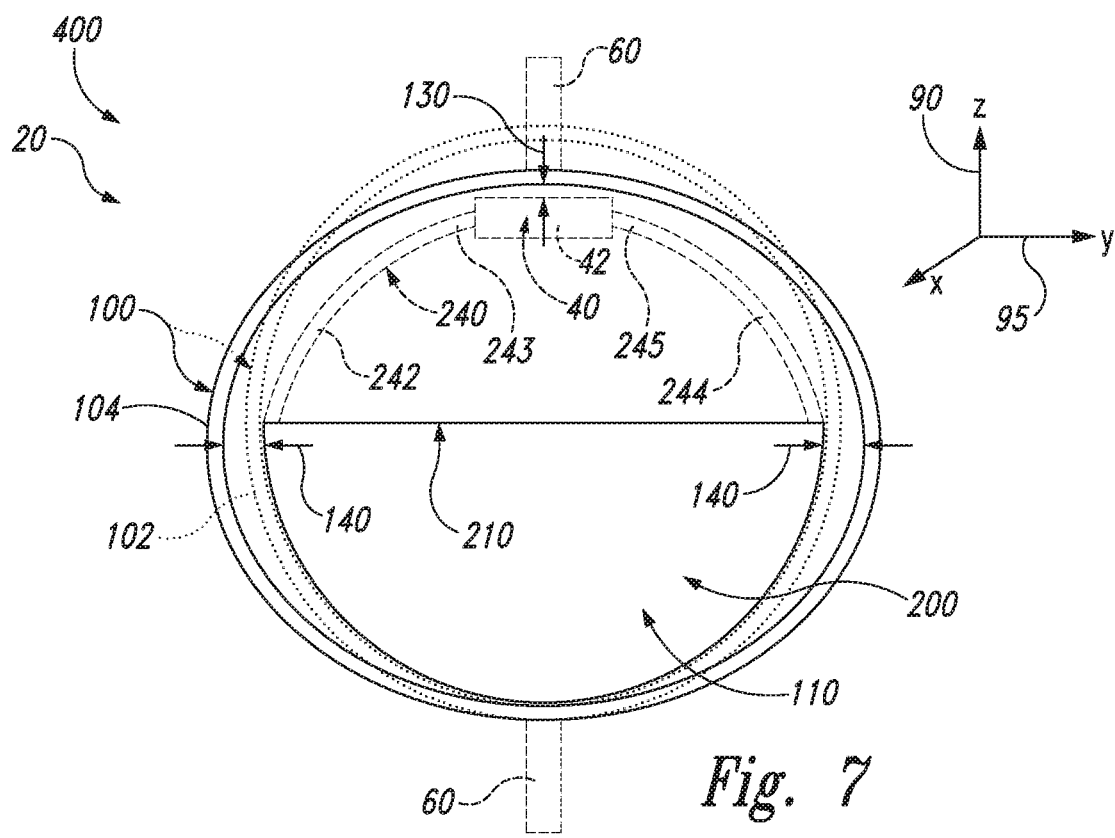
FIG. 7 is a schematic transverse cross-sectional view of an assembly process, according to the present disclosure, for a structurally reinforced composite structure.

Prior to frame assemblies 200 being located within inner volume 110, skin deformation assembly 60 may be utilized to deform (or elastically deform) tubular skin 100 to a deformed conformation 104 (as illustrated in FIG. 7) to provide clearance for frame assemblies 200 to be conveyed through opening 120. Additionally or alternatively, frame deformation assembly 40 also may be utilized to deform (or elastically deform) frame assemblies 200 to decrease one or more dimensions of frame assemblies 200 and provide clearance for frame assemblies 200 to be conveyed through opening 120 and into inner volume 110.

Once frame assemblies 200 are located within inner volume 110, tubular skin 100 and frame assemblies 200 may be operatively attached to one another to form structurally reinforced composite structure 800. This operative attachment may include selective and/or progressive deformation of tubular skin 100 and/or frame assemblies 200 to a target conformation 102 thereof (as illustrated in FIGS. 1-2 and 7-11 and discussed in more detail herein).

Frame support 30 may include and/or be any suitable structure that is configured to support frame assemblies 200 during insertion of frame assemblies 200 into inner volume 110 of tubular skin 100. As illustrative, non-exclusive examples, frame support 30 may include and/or be a gantry structure and/or a cantilever beam structure.

Skin support 50 may include and/or be any suitable structure that is configured to support tubular skin 100 during insertion of frame assemblies 200 into inner volume 110 and/or that is configured to permit tubular skin 100 to deform between the deformed conformation and the target conformation. As illustrative, non-exclusive examples, skin support 50 may include and/or be a support platform and/or a support cradle that may be configured to contact and/or support a lower surface of tubular skin 100.

Skin deformation assembly 60 may include and/or be any suitable structure that may be configured to selectively deform tubular skin 100 to the deformed conformation. This may include decreasing a first dimension 112 of tubular skin 100 in a first direction 90 (such as the Z-direction) and concurrently increasing a second dimension 114 of tubular skin 100 in a second direction 95 (such as the Y-direction), and is discussed in more detail herein.

As an illustrative, non-exclusive example, skin deformation assembly 60 may include and/or be skin support 50 (or a support cradle that defines skin support 50). Under these conditions, the support cradle may be configured to permit tubular skin 100 to deform under the influence of gravity. As another illustrative, non-exclusive example, skin deformation assembly 60 may include and/or be a separate structure that may be configured to provide a deformation force to tubular skin 100 and/or to an outer surface of tubular skin 100. This may include any suitable mechanical skin deformation assembly, which may be configured to apply a mechanical deformation force, pneumatic skin deformation assembly, which may be configured to apply a pneumatic deformation force, and/or hydraulic skin deformation assembly, which may be configured to apply a hydraulic deformation force.

Figure 8:
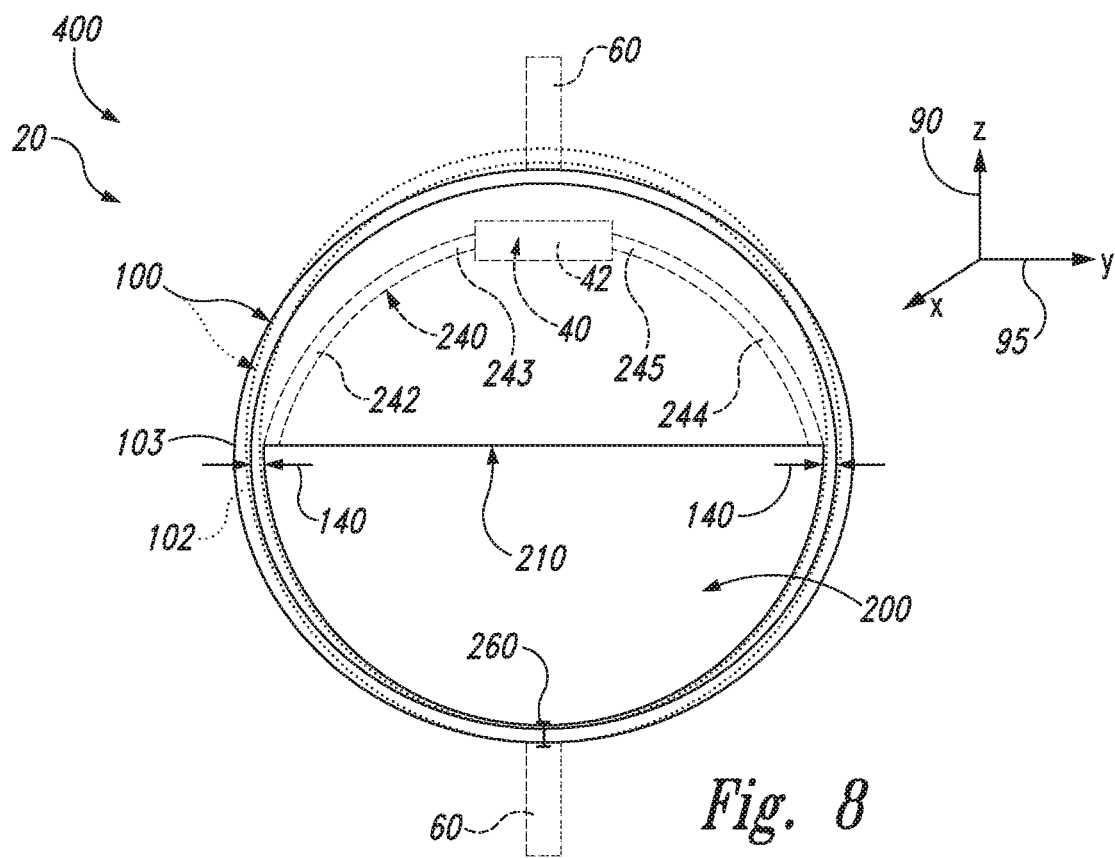
FIG. 8 is another schematic transverse cross-sectional view of the assembly process of FIG. 7.
Figure 9:
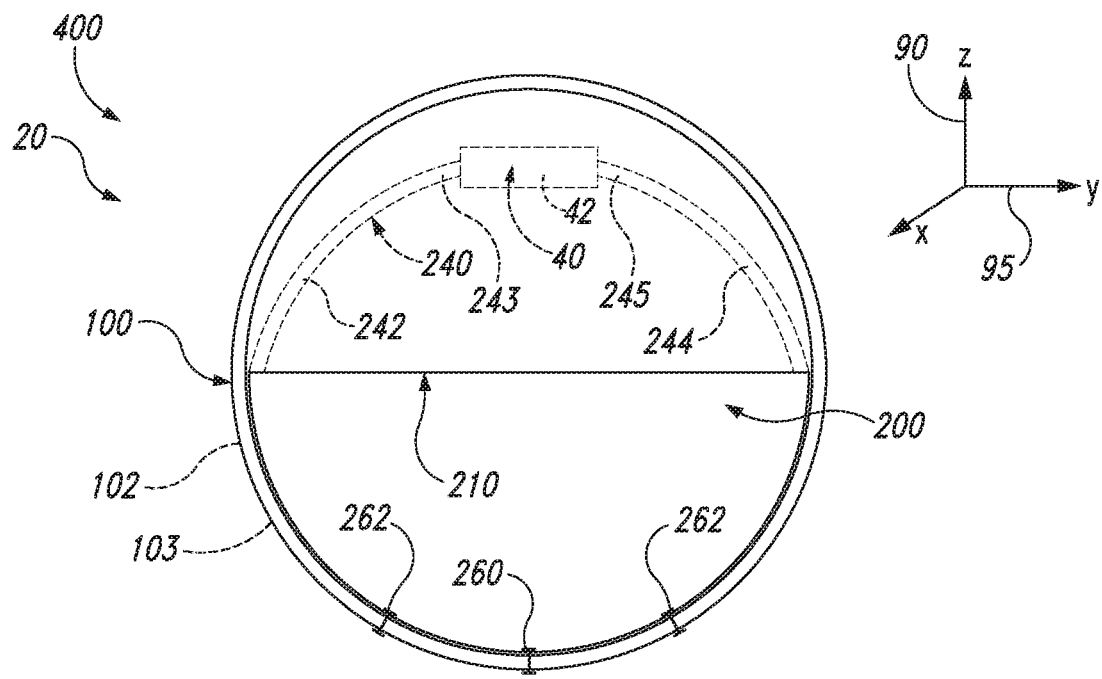
FIG. 9 is another schematic transverse cross-sectional view of the assembly process of FIG. 7.

Frame deformation assembly 40 may include and/or be any suitable structure that may be configured to selectively deform frame assemblies 200 to a deformed frame conformation to permit frame assemblies 200 to be conveyed through opening 120 and/or into inner volume 110. This may include deformation to decrease a first dimension 202 of frame assemblies 200 in first direction 90, deformation to decrease first dimension 202 of second sub-frame 240 in first direction 90, and/or deformation to decrease a second dimension 204 of second sub-frame 240 in second direction 95. This also may include concurrently and/or simultaneously decreasing first dimension 202 of second sub-frame 240 and second dimension 204 of second sub-frame 240, as illustrated in FIGS. 7-9. An illustrative, non-exclusive example of frame deformation assembly 40 includes a tension structure 42 that is configured to be placed in tension to deform frame assemblies 200, as discussed in more detail herein.

Conveyance structure 70 may include and/or be any suitable structure that may be configured to locate and/or convey frame assemblies 200 within and/or into inner volume 110 of tubular skin 100, that may be configured to translate frame support 30 relative to skin support 50, that may be configured to translate skin support 50 relative to frame support 30, and/or that may be configured to translate frame support 30 and skin support 50 relative to one another. As illustrative, non-exclusive examples, conveyance structure 70 may include and/or be a trolley, a track, and/or a linear actuator and may be operatively attached to and/or may form a portion of frame support 30 and/or skin support 50.

As discussed herein with reference to FIG. 3 and illustrated in FIG. 4, frame structure 198 includes a plurality of frame assemblies 200 that may be spaced apart along a longitudinal length (as defined along the X-axis) of frame structure 198. As also discussed, a portion of frame assemblies 200, such as passenger floor frame 214, may extend along the longitudinal length of frame structure 198 and may operatively affix the plurality of frame assemblies 200 to one another, forming frame structure 198.

With continued reference to FIG. 4, first direction 90 and second direction 95 may be defined in any suitable manner. As an illustrative, non-exclusive example, first direction 90 and second direction 95 may be defined in a transverse plane of tubular skin 100 and/or of frame structure 198 (i.e., the Y-Z plane). As another illustrative, non-exclusive example, first direction 90 and second direction 95 may be perpendicular to one another and/or may be perpendicular to the longitudinal length of tubular skin 100 and/or of frame structure 198 (i.e., may be perpendicular to the X-axis). As yet another illustrative, non-exclusive example, the first direction may be (at least substantially) vertical. As another illustrative, non-exclusive example, the second direction may be (at least substantially) horizontal.

FIG. 5 is a more detailed but still schematic cross-sectional view of a system 20, according to the present disclosure, for assembling a structurally reinforced composite structure 800. FIG. 5 illustrates that system 20 may include and/or be an automated system 20 that includes one or more assembly robots 80. Assembly robots 80 may be configured to operatively attach frame assembly 200 to tubular skin 100. This may include drilling one or more holes within frame assembly 200 and/or within tubular skin 100. Additionally or alternatively, this also may include inserting one or more fasteners into the one or more holes to operatively attach frame assembly 200 to tubular skin 100.

In the illustrative, non-exclusive example of FIG. 5, system 20 includes five assembly robots 80, and each assembly robot 80 is configured to operatively affix a corresponding portion of frame assembly 200 to a corresponding portion of tubular skin 100. However, other numbers and/or configurations of assembly robots 80 are also within the scope of the present disclosure. As illustrative, non-exclusive examples, the number of assembly robots 80 may be selected based upon space constraints within inner volume 110, based upon mobility constraints of assembly robots 80 within inner volume 110, and/or based upon a desired rate at which assembly robots 80 attach frame assembly 200 to tubular skin 100.

Tubular skin 100 and/or frame assembly 200 may define any suitable orientation during assembly of structurally reinforced composite structure 800. As an illustrative, non-exclusive example, subsequent to being assembled, structurally reinforced composite structure 800 may be configured to be operated and/or utilized in an upright orientation; and system 20 may be configured to locate frame assembly 200 within inner volume 110 of tubular skin 100 and/or to operatively attach frame assembly 200 to tubular skin 100 while frame assembly 200 and tubular skin 100 are in the upright orientation (with the upright orientation being illustrated in FIG. 5). As another illustrative, non-exclusive example, system 20 also may be configured to locate frame assembly 200 within inner volume 110 of tubular skin 100 and/or to operatively attach frame assembly 200 to tubular skin 100 while frame assembly 200 and tubular skin 100 are in an upside down orientation. This may include performing methods 300, which are discussed in more detail herein, in the upright orientation and/or in the upside down orientation.

Figure 6:
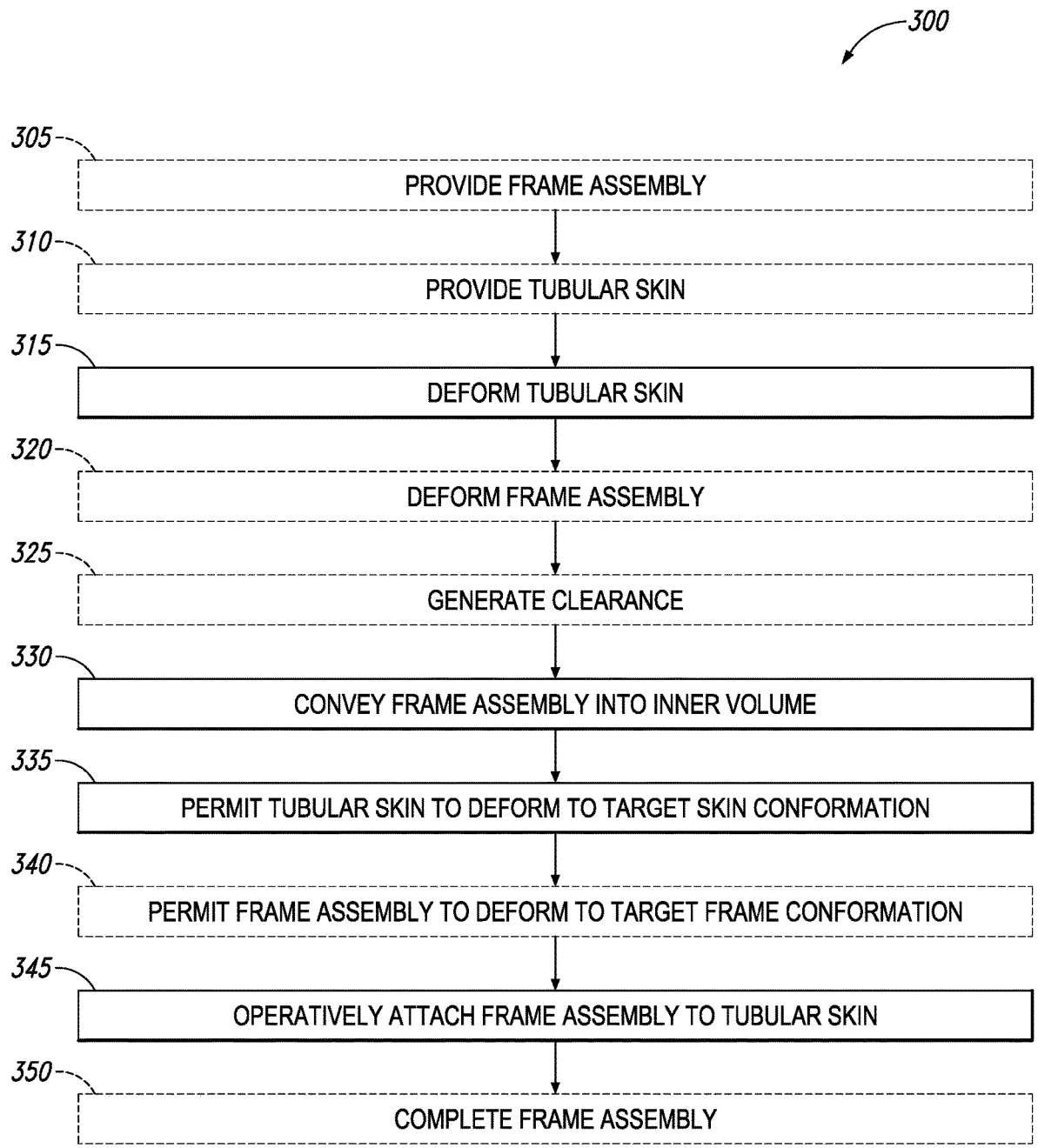
FIG. 6 is a flowchart depicting methods, according to the present disclosure, of assembling a structurally reinforced composite structure.

FIG. 6 is a flowchart depicting methods 300, according to the present disclosure, of assembling a structurally reinforced composite structure, while FIGS. 7-11 are schematic transverse cross-sectional views of an assembly process 400, according to the present disclosure, for assembling a structurally reinforced composite structure 800. Assembly process (or process flow) 400 that is illustrated in FIGS. 7-11 may be performed using a system 20 for assembling structurally reinforced composite structure 800, such as system 20 that is illustrated in FIGS. 4-5 and discussed herein. Additionally or alternatively, assembly process 400 may be performed as part of methods 300 of FIG. 6 and is discussed herein in the context of methods 300. However, it is within the scope of the present disclosure that assembly process 400 of FIGS. 7-11 may be utilized independently from system 20 and/or independently from methods 300.

Methods 300 may include providing a frame assembly at 305 and/or providing a composite tubular skin at 310. Methods 300 include deforming the tubular skin at 315 and may include deforming the frame assembly at 320 and/or generating a clearance at 325. Methods 300 further include conveying the frame assembly into an inner volume that is defined by the tubular skin at 330 and permitting the tubular skin to deform to a target skin conformation at 335. Methods 300 also may include permitting the frame assembly to deform to a target frame conformation at 340, include operatively attaching the frame assembly to the tubular skin at 345, and may include completing the frame assembly at 350.

Providing the frame assembly at 305 may include providing any suitable frame assembly in any suitable manner. As illustrative, non-exclusive examples, the providing at 305 may include retrieving the frame assembly and/or locating the frame assembly proximal to the tubular skin. As another illustrative, non-exclusive example, the providing at 305 also may include at least partially, or completely, assembling the frame assembly from a plurality of components, illustrative, non-exclusive examples of which are discussed herein.

As a more specific but still illustrative, non-exclusive example, the providing at 305 may include providing a frame assembly (such as frame assembly 200 of FIGS. 7-11) that includes a first sub-frame (such as first sub-frame 210 of FIGS. 7-11) and/or a second sub-frame (such as second sub-frame 240 of FIGS. 7-11). The second sub-frame may be operatively attached to the first sub-frame. The first sub-frame may be (at least substantially) rigid in a first direction and/or in a second direction (such as first direction 90 and/or second direction 95 of FIGS. 7-11). The second sub-frame may include a first upper side frame and a second upper side frame (such as first upper side frame 242 and second upper side frame 244 of FIGS. 7-11).

Figure 11:
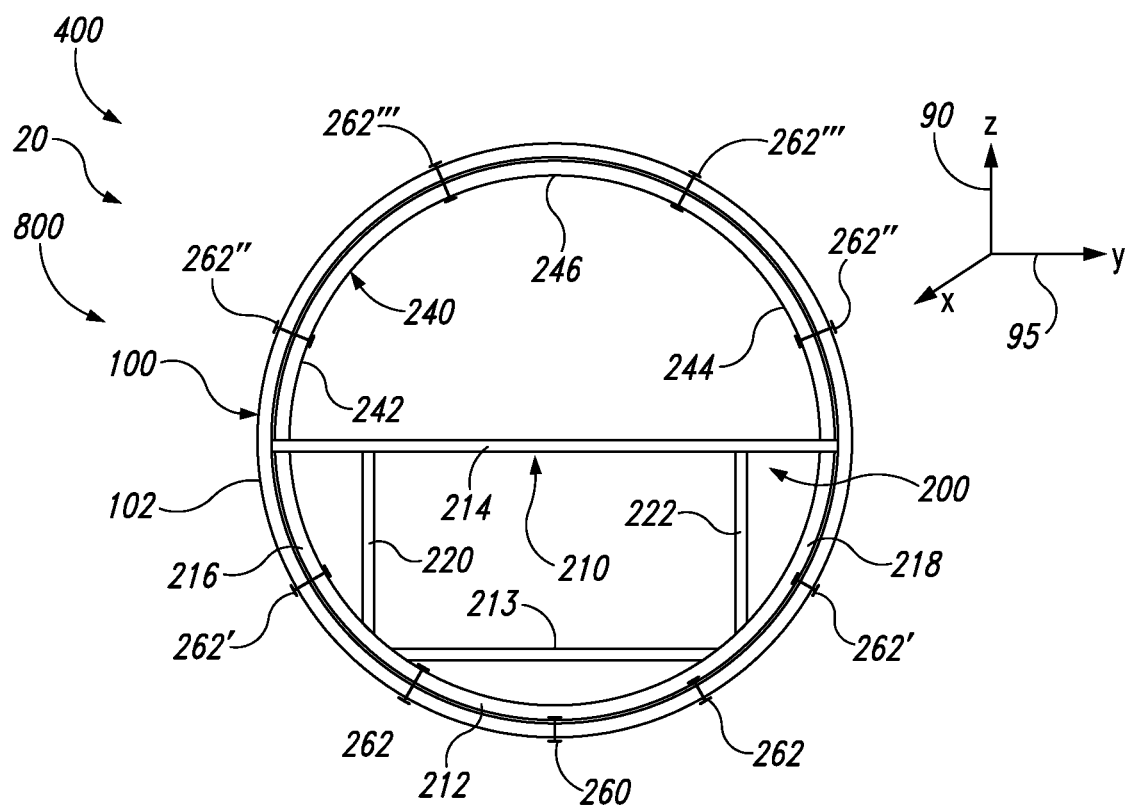
FIG. 11 is another schematic transverse cross-sectional view of the assembly process of FIG. 7.

As another more specific but still illustrative, non-exclusive example, and when the structurally reinforced composite structure is a fuselage barrel of an aircraft, the first sub-frame may include a keel frame, a passenger floor frame, a first lower side frame, a second lower side frame, a first stanchion, and/or a second stanchion (such as keel frame 212, passenger floor frame 214, first lower side frame 216, second lower side frame 218, first stanchion 220, and/or second stanchion 222 of FIG. 11). The first lower side frame may extend between and/or operatively attach the keel frame and the passenger floor frame. The second lower side frame also may extend between and/or operatively attach the keel frame and the passenger floor frame. The first stanchion may extend between and/or operatively attach the first lower side frame and the passenger floor frame. The second stanchion may extend between and/or operatively attach the second lower side frame and the passenger floor frame.

Providing the tubular skin at 310 may include providing any suitable tubular skin in any suitable manner. As illustrative, non-exclusive examples, the providing at 310 may include retrieving the tubular skin and/or locating the tubular skin proximal to the frame assembly. As another illustrative, non-exclusive example, the providing at 310 also may include forming, defining, and/or creating the tubular skin.

As a more specific but still illustrative, non-exclusive example, the providing at 310 may include providing tubular skin 100 of FIGS. 7-11. As another more specific but still illustrative, non-exclusive example, and when the structurally reinforced composite structure includes a fuselage barrel of an aircraft, the providing at 310 may include providing an outer skin of the fuselage barrel. Additional illustrative, non-exclusive examples of the tubular skin are disclosed herein.

When the tubular skin is operatively attached to the frame assembly to form the structurally reinforced composite structure, the tubular skin may have and/or define a target conformation. Deforming the tubular skin at 315 may include deforming (or elastically deforming) the tubular skin to a deformed skin conformation that is different from the target conformation. This may include deforming to provide and/or produce the generating at 325.

As an illustrative, non-exclusive example, the tubular skin may at least partially bound and/or define an inner volume; and, when the tubular skin is in the target conformation, the inner volume may have and/or define a target shape. In addition, the inner volume may define a first target dimension in a first direction and a second target dimension in a second direction. Under these conditions, the deforming at 315 may include decreasing a first dimension of the inner volume relative to the first target dimension and/or increasing a second target dimension of the inner volume relative to the second target dimension.

As another illustrative, non-exclusive example, the deforming at 315 may include applying a deformation force to the tubular skin. Illustrative, non-exclusive examples of the deformation force include a gravitational force, a mechanical force, a pressure force, a hydraulic force, and/or a pneumatic force.

As a more specific but still illustrative, non-exclusive example, and as illustrated in FIG. 7, the deforming at 315 may include utilizing a skin deformation assembly 60 to deform tubular skin 100 to deformed conformation 104 that is different from target conformation 102 of the tubular skin. As illustrated in dotted lines in FIG. 7, and prior to deformation of tubular skin 100 to deformed conformation 104 (e.g., when tubular skin 100 is in target conformation 102 and/or prior to the deforming at 315), a clearance between tubular skin 100 and frame assembly 200 in second direction 95 may be insufficient to permit frame assembly 200 to be conveyed (such as via the conveying at 330) into inner volume 110 of tubular skin 100, at least without contact between frame assembly 200 and tubular skin 100. However, when tubular skin 100 is in deformed conformation 104 (i.e., subsequent to the deforming at 315 and prior to the permitting at 335), the clearance between frame assembly 200 and tubular skin 100 in second direction 95 may be sufficient to permit the conveying at 330. This is illustrated at 140 in FIG. 7.

Deforming the frame assembly at 320 may include deforming (or elastically deforming) the frame assembly in any suitable manner. As an illustrative, non-exclusive example, the deforming at 320 may include deforming to produce the generating at 325. As another illustrative, non-exclusive example, the deforming at 320 also may include deforming to permit the conveying at 330. As a more specific but still illustrative, non-exclusive example, the deforming at 320 may include deforming the frame assembly in the first direction and/or in the second direction. As another more specific but still illustrative, non-exclusive example, and when the frame assembly includes the first sub-frame and the second sub-frame, the deforming at 320 may include deforming the second sub-frame in the first direction and/or deforming the second sub-frame in the second direction.

As yet another more specific but still illustrative, non-exclusive example, and with reference to FIG. 7, the frame assembly may include first upper side frame 242 and second upper side frame 244, and the deforming at 320 may include urging an unattached end 243 of first upper side frame 242 toward an unattached end 245 of second upper side frame 244. This may decrease the first dimension of frame assembly 200 in first direction 90, such as to produce the generating at 325 and/or to permit the conveying at 330. This also may decrease the second dimension of a portion of second sub-frame 240 that is proximal to unattached end 243 and unattached end 245. As illustrated in FIG. 7, unattached end 243 of first upper side frame 242 may be urged toward unattached end 245 of second upper side frame 244 with a frame deformation assembly 40. Illustrative, non-exclusive examples of frame deformation assembly 40 are disclosed herein.

Generating the clearance at 325 may include generating the clearance to permit, or provide space for, the frame assembly to be conveyed into the inner volume of the tubular skin. As discussed, the generating at 325 may include generating the clearance responsive to, as a result of, and/or concurrently with the deforming at 315 and/or the deforming at 320. As an illustrative, non-exclusive example, and with reference to FIG. 7, the deforming at 315 may include deforming to generate second clearance 140 in second direction 95. As another illustrative, non-exclusive example, and with continued reference to FIG. 7, the deforming at 320 may include deforming to generate a first clearance 130 in first direction 90.

Conveying the frame assembly into the inner volume at 330 may include conveying, translating, and/or locating the frame assembly within the inner volume that is defined by the tubular skin and may be accomplished in any suitable manner. As an illustrative, non-exclusive example, the conveying at 330 may include conveying the frame assembly into the inner volume through and/or via an opening that is defined by the tubular skin and that provides access to the inner volume. As additional illustrative, non-exclusive examples, the conveying at 330 may include translating the frame assembly relative to the tubular skin, translating the tubular skin relative to the frame assembly, translating the frame assembly and the tubular skin relative to one another, translating the tubular skin along a longitudinal axis thereof, and/or translating the frame assembly along a longitudinal axis thereof.

Regardless of the exact mechanism that may be utilized during the conveying at 330, the frame assembly may be (partially and/or completely) located within the inner volume subsequent to the conveying at 330. This is illustrated in FIG. 7, with frame assembly 200 being located within inner volume 110 of tubular skin 100. In FIG. 7, tubular skin 100 is deformed to deformed conformation 104 by skin deformation assembly 60 to provide second clearance 140 between tubular skin 100 and frame assembly 200 (or first sub-frame 210 thereof), which may permit the conveying at 330. In addition, first upper side frame 242 and second upper side frame 244 of second sub-frame 240, when present, are deformed by frame deformation assembly 40 to provide first clearance 130 between tubular skin 100 and frame assembly 200 (or second sub-frame 240 thereof), which also may permit the conveying at 330.

Permitting the tubular skin to deform to the target skin conformation at 335 may include permitting the tubular skin to deform and/or transition from the deformed conformation to the target conformation and may be accomplished in any suitable manner. As an illustrative, non-exclusive example, the permitting at 335 may include releasing the deformation force that may be applied by the skin deformation assembly. As another illustrative, non-exclusive example, the permitting at 335 may include urging the tubular skin to the target skin conformation, such as via contact between the tubular skin and the frame assembly. This may include urging during, at least concurrently with, and/or as a result of the permitting at 340, the operatively attaching at 345, and/or the completing at 350.

It is within the scope of the present disclosure that the permitting at 335 may be an at least substantially single-step process. As an illustrative, non-exclusive example, and when the permitting at 335 includes releasing the deformation force, the act of releasing the deformation force may (at least substantially) permit the tubular skin to deform to the target skin conformation.

However, it is also within the scope of the present disclosure that the permitting at 335 may be a multi-step process in which the conformation of the tubular skin is varied progressively from the deformed conformation, via one or more intermediate conformations, to the target conformation. As an illustrative, non-exclusive example, and when the permitting at 335 includes urging the tubular skin during and/or via the permitting at 340, the operatively attaching at 345, and the completing at 350, the tubular skin may progress through one or more intermediate conformations as the tubular skin progresses from the deformed conformation to the target conformation.

As a more specific but still illustrative, non-exclusive example, and with reference to FIG. 7, tubular skin 100 initially may be in deformed conformation 104. Then, and as illustrated in FIG. 8, a magnitude of the deformation force that is applied by skin deformation assembly 60 may be decreased, permitting tubular skin 100 to transition to an intermediate conformation 103 that is between deformed conformation 104 and target conformation 102. This may decrease second clearance 140 and/or may bring frame assembly 200 and tubular skin 100 closer together. Additionally or alternatively, frame assembly 200 may be operatively attached to tubular skin 100 at an initial attachment point 260 (such as via the operatively attaching at 345).

Subsequently, and as illustrated in FIG. 9, the deformation force may be reduced further (or eliminated). This may decrease further (or eliminate) second clearance 140, may bring frame assembly 200 and tubular skin 100 into contact with one another, and/or may cause tubular skin 100 to have, or approach, target conformation 102. Additionally or alternatively, frame assembly 200 and tubular skin 100 may be operatively attached to one another at a plurality of subsequent attachment points 262 (such as via the operatively attaching at 245).

Figure 10:
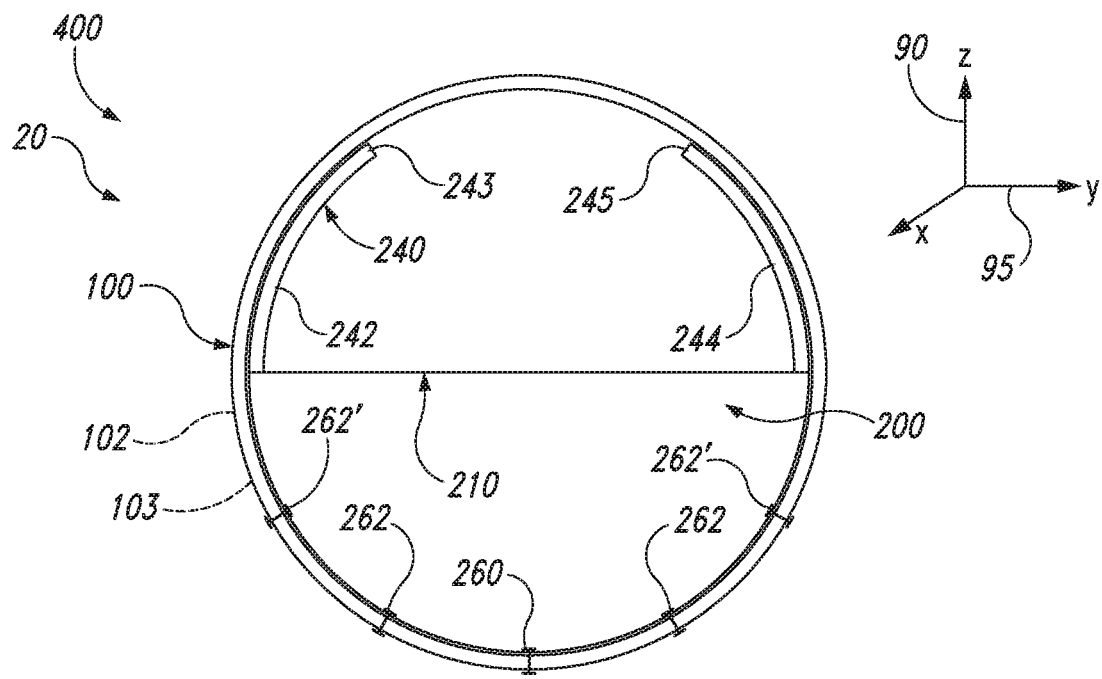
FIG. 10 is another schematic transverse cross-sectional view of the assembly process of FIG. 7.

Permitting the frame assembly to deform to the target frame conformation at 340 may be accomplished in any suitable manner. As an illustrative, non-exclusive example, the permitting at 340 may include releasing the frame assembly from the frame deformation assembly and/or relaxing a deformation force that is applied to the frame assembly by the frame deformation assembly. As a more specific but still illustrative, non-exclusive example, the permitting at 340 may include releasing unattached end 243 of first upper side frame 242 and/or releasing unattached end 245 of second upper side frame 244 from frame deformation assembly 40 to permit first upper side frame 242 and second upper side frame 244 to move away from each other and/or to contact tubular skin 100. This is illustrated in FIGS. 9 and 10. As discussed, contact between tubular skin 100 and first upper side frame 242 and/or second upper side frame 244 may urge tubular skin 100 toward and/or to target conformation 102.

Operatively attaching the frame assembly to the tubular skin at 345 may include operatively attaching to form and/or define at least a portion of the structurally reinforced composite structure and may be accomplished in any suitable manner. As an illustrative, non-exclusive example, the operatively attaching at 345 may include operatively attaching at an initial attachment point, such as initial attachment point 260 of FIGS. 8-11. As another illustrative, non-exclusive example, the operatively attaching at 345 further may include operatively attaching at a plurality of subsequent attachment points subsequent to operative attachment at the initial attachment point. This is illustrated by subsequent attachment points 262 of FIGS. 9-11.

When the operatively attaching at 345 includes operatively attaching at the plurality of subsequent attachment points 262, 262', 262'', 262''', the operatively attaching at 345 may include progressing around a perimeter and/or boundary of inner volume 110. This may permit space and/or clearance between tubular skin 100 and frame assembly 200 to be progressively decreased and/or eliminated and/or may permit assembly of structurally reinforced composite structure 800 without the use of shims between tubular skin 100 and frame assembly 200.

As an illustrative, non-exclusive example, and subsequent to operative attachment at initial attachment point 260, tubular skin 100 and frame assembly 200 then may be operatively attached at subsequent attachment points 262 on each side of initial attachment point 260 prior to operative attachment at subsequent attachment points 262' that are farther from initial attachment point 260 than subsequent attachment points 262. This process may be repeated, with tubular skin 100 and frame assembly 200 being operatively attached at subsequent attachment points 262'' after operative attachment at subsequent attachment points 262' but prior to operative attachment at subsequent attachment points 262'''.

The operatively attaching at 345 may include operatively attaching in any suitable manner. As an illustrative, non-exclusive example, the operatively attaching at 345 may include drilling through the frame assembly and/or the tubular skin to define a fastener receptacle. As another illustrative, non-exclusive example, the operatively attaching at 345 also may include extending and/or locating a fastener within the fastener receptacle. Illustrative, non-exclusive examples of the fastener include any suitable bolt, nut, screw, threaded fastener, and/or rivet.

Completing the frame assembly at 350 may include completing assembly of the frame assembly and may be accomplished in any suitable manner and/or with any suitable timing within methods 300. As an illustrative, non-exclusive example the frame assembly may be (at least substantially) completed prior to the conveying at 330. As another illustrative, non-exclusive example, at least a portion of the frame assembly may be added to and/or operatively attached to the frame assembly subsequent to the conveying at 330. As yet another illustrative, non-exclusive example, at least a portion of the frame assembly may be added to and/or operatively attached to the frame assembly subsequent to the permitting at 340 and/or at least partially concurrently with the attaching at 345.

As a more specific but still illustrative, non-exclusive example, and subsequent to the permitting at 340, the completing at 350 may include extending a crown frame 246 between unattached end 243 of first upper side frame 242 and unattached end 245 of second upper side frame 244, as illustrated in FIG. 11. As another more specific but still illustrative, non-exclusive example, and subsequent to the extending crown frame 246, the operatively attaching at 345 may include operatively attaching crown frame 246 to tubular skin 100, such as at subsequent attachment points 246'''.

For clarity, FIG. 11 illustrates frame assembly 200 as including a plurality of components that comprise first sub-frame 210 instead of schematically illustrating sub-frame 210 as in FIGS. 7-10. This plurality of components includes a keel frame 212, a cargo floor frame 213, a passenger floor frame 214, a first lower side frame 216, a second lower side frame 218, a first stanchion 220, and a second stanchion 222. The interrelation among these various components is discussed herein. It is within the scope of the present disclosure that first sub-frame 210 may include any, or even all, of these illustrated components. However, it is also within the scope of the present disclosure that first sub-frame 210 may not include one or more of these illustrated components.

As discussed, the systems and methods according to the present disclosure may permit space and/or clearance between tubular skin 100 and frame assembly 200 to be decreased and/or eliminated during assembly of structurally reinforced composite structure 800, which may permit structurally reinforced composite structure 800 to be assembled without, or without requiring, the use of shims between tubular skin 100 and frame assembly 200. As an illustrative, non-exclusive example, the completing at 350 further may include adjusting a distance between unattached end 243 of first upper side frame 242 and unattached end 245 of second upper side frame 244 with crown frame 246 such that tubular skin 100 is (at least substantially) in contact with crown frame 246.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A system for assembling a structurally reinforced composite structure, the system comprising:
 a frame support that is configured to support a frame assembly of the structurally reinforced composite structure during insertion of the frame assembly into an inner volume that is at least partially bounded by a composite tubular skin of the structurally reinforced composite structure;
 a frame deformation assembly that is configured to selectively deform the frame assembly to a deformed frame conformation to decrease a first dimension of the frame assembly in a first direction;
 a skin support that is configured to support the composite tubular skin during insertion of the frame assembly into the composite tubular skin; and
 a skin deformation assembly that is configured to selectively deform the composite tubular skin to a deformed skin conformation to decrease a first dimension of the composite tubular skin in the first direction and to concurrently increase a second dimension of the composite tubular skin in a second direction.

2. The system of claim 1, wherein the system further includes a conveyance structure that is configured to translate the frame support and the skin support relative to one another to convey the frame assembly into the inner volume.

3. The system of claim 1, wherein the frame support is supporting the frame assembly, wherein the skin support is supporting the composite tubular skin, wherein the frame assembly is located within the inner volume, wherein the frame deformation assembly has deformed the frame assembly to the deformed frame conformation, and further wherein the skin deformation assembly has deformed the composite tubular skin to the deformed skin conformation.

4. The system of claim 3, wherein the system includes the frame assembly and the composite tubular skin.

5. The system of claim 1, wherein the system further includes an assembly robot that is configured to operatively attach the frame assembly to the composite tubular skin.

6. The system of claim 1, wherein the system further includes the composite tubular skin and the frame assembly.

7. The system of claim 6, wherein the composite tubular skin includes an outer skin of a fuselage barrel of an aircraft.

8. The system of claim 7, wherein the composite tubular skin further includes a plurality of stringers that extend along a length of the composite tubular skin.

9. The system of claim 1, wherein the first direction is at least substantially vertical and further wherein the second direction is at least substantially horizontal.

10. The system of claim 1, wherein the frame assembly includes a first sub-frame and a second sub-frame that is operatively attached to the first sub-frame, wherein the first sub-frame is at least substantially rigid in the second direction, wherein the second sub-frame includes a first upper side frame and a second upper side frame, and further wherein the frame deformation assembly is configured to urge an unattached end of the first upper side frame toward an unattached end of the second upper side frame to decrease the first dimension of the frame assembly in the first direction.

11. The system of claim 10, wherein the system includes the frame assembly.

12. The system of claim 10, wherein the first sub-frame includes a keel frame, a passenger floor frame, a first lower side frame that extends between the keel frame and the passenger floor frame, a second lower side frame that extends between the keel frame and the passenger floor frame, a first stanchion that extends between the first lower side frame and the passenger floor frame, and a second stanchion that extends between the second lower side frame and the passenger floor frame.

13. The system of claim 1, wherein, subsequent to being assembled, the structurally reinforced composite structure is configured to be utilized in an upright orientation, and further wherein the system is configured to locate the frame assembly within the inner volume while the composite tubular skin and the frame assembly are at least one of:
  (i) at least substantially in the upright orientation; and
  (ii) at least substantially in an upside down orientation.

14. The system of claim 1, wherein the frame support includes a gantry structure.

15. The system of claim 1, wherein the frame deformation assembly includes a tension structure that is configured to be placed in tension to deform the frame assembly to the deformed frame conformation.

16. The system of claim 1, wherein the skin support includes a support cradle that is configured to support a lower surface of the composite tubular skin.

17. The system of claim 16, wherein the skin deformation assembly includes the support cradle, and further wherein the support cradle is configured to permit the composite tubular skin to elastically deform under the influence of gravity.

18. The system of claim 1, wherein the skin deformation assembly is configured to apply a deformation force to an outer surface of the composite tubular skin.

19. The system of claim 18, wherein the skin deformation assembly includes at least one of:
  (i) a mechanical skin deformation assembly;
  (ii) a pneumatic skin deformation assembly; and
  (iii) a hydraulic skin deformation assembly.

20. The system of claim 18, wherein the system includes the composite tubular skin.

* * * * *